(12) United States Patent
Wehmeier et al.

(10) Patent No.: US 8,489,270 B2
(45) Date of Patent: Jul. 16, 2013

(54) METHOD AND DEVICE FOR DIAGNOSING THE DYNAMICS OF AN EXHAUST GAS SENSOR

(75) Inventors: Kersten Wehmeier, Ludwigsburg (DE); Michael Pfeil, Marbach am Neckar (DE); Siyun Chu, Marbach am Neckar (DE); Albrecht Clement, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 12/892,493

(22) Filed: Sep. 28, 2010

(65) Prior Publication Data

US 2011/0082622 A1 Apr. 7, 2011

(30) Foreign Application Priority Data

Oct. 6, 2009 (DE) .................. 10 2009 045 376

(51) Int. Cl.
*G07C 5/00* (2006.01)
(52) U.S. Cl.
USPC ....... 701/29.7; 701/29.1; 701/29.2; 701/29.6; 701/30.5; 701/34.4; 60/276; 60/277; 60/280; 60/285; 73/114.69; 73/114.72
(58) Field of Classification Search
None
See application file for complete search history.

(56) References Cited

U.S. PATENT DOCUMENTS

| | | | | |
|---|---|---|---|---|
| 6,018,982 | A * | 2/2000 | Friese et al. | 73/23.2 |
| 6,209,316 | B1 * | 4/2001 | Duvinage et al. | 60/274 |
| 6,318,073 | B1 * | 11/2001 | Boegner et al. | 60/274 |
| 6,880,328 | B2 * | 4/2005 | Daetz et al. | 60/285 |
| 7,861,515 | B2 * | 1/2011 | Brahma | 60/277 |
| 7,934,420 | B2 * | 5/2011 | Kama et al. | 73/114.69 |
| 8,132,400 | B2 * | 3/2012 | Storhok et al. | 60/285 |
| 8,186,205 | B2 * | 5/2012 | Wehmeier et al. | 73/114.69 |
| 8,359,899 | B2 * | 1/2013 | Graupner et al. | 73/1.06 |
| 2002/0069698 | A1 * | 6/2002 | Wagner et al. | 73/118.1 |
| 2003/0014967 | A1 * | 1/2003 | Daetz et al. | 60/285 |
| 2006/0032744 | A1 * | 2/2006 | Busch et al. | 204/424 |
| 2007/0125069 | A1 * | 6/2007 | Storhok et al. | 60/285 |
| 2007/0125070 | A1 * | 6/2007 | Storhok et al. | 60/285 |
| 2007/0277787 | A1 * | 12/2007 | Husak et al. | 123/491 |
| 2008/0314023 | A1 * | 12/2008 | Pohmerer et al. | 60/285 |
| 2009/0013665 | A1 * | 1/2009 | Brahma | 60/276 |
| 2009/0056313 | A1 * | 3/2009 | Kama et al. | 60/277 |
| 2009/0100922 | A1 * | 4/2009 | Korbel et al. | 73/114.72 |
| 2010/0185379 | A1 * | 7/2010 | Burkhardt et al. | 701/103 |

FOREIGN PATENT DOCUMENTS

DE 102 60 721 7/2004

* cited by examiner

*Primary Examiner* — Khoi Tran
*Assistant Examiner* — Jonathan L Sample
(74) *Attorney, Agent, or Firm* — Merchant & Gould P.C.

(57) ABSTRACT

The invention relates to a method and corresponding device for diagnosing the dynamics of an exhaust gas sensor, which is disposed in an exhaust gas duct of an internal combustion engine in the direction of flow of the exhaust gas upstream or downstream of a catalytic converter and with which the air/fuel ratio of the gas mixture supplied to the internal combustion engine is controlled via a control circuit. During diagnosis, provision is made for at least one actuator intervention to be specified by means of a control algorithm of a diagnostic controller specifically m the direction of an asymmetric behavior, which is achieved by an extension of one of the two ramps, until the actuator intervention is compensated by an asymmetric dynamic error of the exhaust gas sensor, a reaction to said actuator intervention being used as criterion for assessing an asymmetric dynamic error of said exhaust gas sensor.

16 Claims, 1 Drawing Sheet

METHOD AND DEVICE FOR DIAGNOSING THE DYNAMICS OF AN EXHAUST GAS SENSOR

This application claims benefit of Ser. No. 10 2009 045 376.8, filed 6 Oct. 2009 in Germany and which application is incorporated herein by reference. To the extent appropriate, a claim of priority is made to the above disclosed application.

BACKGROUND

The invention relates to a method for diagnosing the dynamics of an exhaust gas sensor embodied as a lambda probe, which is disposed in an exhaust gas duct of an internal combustion engine in the direction of flow of the exhaust gas upstream or downstream of a catalytic converter and with which the air/fuel ratio of the gas mixture supplied to the internal combustion engine is controlled via a control circuit.

The invention further relates to a device for carrying out the method according to the invention.

A lambda control in combination with a catalytic converter is today the most efficient method for emission control of an Otto engine. Very low emission levels can be achieved only through their interaction with currently available ignition and fuel injection systems.

The use of a three-way or selective catalytic converter is particularly efficient. This catalytic converter has the capability of breaking down hydrocarbons, carbon monoxide and nitrogen oxides up to more than 98% if the engine is operated in a range of 1% around the stoichiometric air/fuel ratio where $\lambda=1$. The lambda value thereby indicates how far the actually present air/fuel mixture deviates from the value $\lambda=1$, which corresponds to a complete combustion of a theoretically required mass ratio of 14.7 kg air to 1 kg gasoline, i.e. the lambda value is calculated by dividing the air mass supplied by the theoretically required amount of air. In the case of excess air, $\lambda>1$ (lean mixture). In the case of excess fuel, $\lambda<1$ (rich mixture).

Lambda probes are used in modern internal combustion engines, which determine the oxygen concentration in the exhaust gas of the internal combustion engine and control the air and fuel supply to said internal combustion engine such that a composition of the exhaust gas is achieved, which is optimal for the exhaust gas aftertreatment by the catalytic converters provided in the exhaust gas duct of said internal combustion engine. In so doing, the lambda value is preferably controlled to 1, i.e. to a stoichiometric ratio of fuel to air. The pollutant emissions of said internal combustion engine can thus be minimized.

Different forms of lambda probes are in use. In the case of a two point lambda probe, also known as a bistable sensor or a Nernst sensor, the characteristic curve at $\lambda=1$ has a steplike descent. For that reason, said two point lambda probe can essentially discriminate only between rich exhaust gas during operation of the internal combustion engine with excess fuel and lean exhaust gas during operation with excess air.

A wideband lambda probe, also known as a continuous-action or linear lambda probe, allows for the measurement of the lambda value in the exhaust gas in a wide range around $\lambda=1$. An internal combustion engine can also, for example, thereby be controlled to a lean operation with excess air.

A rapid control of the exhaust gas composition to a predetermined lambda value is essential for the low-emission operation of the internal combustion engine. This is also especially true for internal combustion engines with cylinder-specific control, wherein the air/fuel mixture is individually adjusted for each cylinder of said internal combustion engine on the basis of the signal of the common lambda probe. In so doing, the lambda measurement must take place with a high temporal resolution in order for the compositions of the successive exhaust gas volumes of the different cylinders arriving at the lambda probe to be determined and to be associated with a respective cylinder.

Beside the selected control parameters of the lambda control circuit and the distance parameters, the dynamics of the lambda probe determine the speed of the control circuit. At the same time, the dynamics of the lambda probes, when they are new, are also sufficient for a cylinder-specific control with a common lambda probe for all cylinders in a common exhaust gas duct. Due to the effects of ageing, the dynamic characteristics of the lambda probes can, however, change to such an extent that the reaction speed of said lambda probe when determining the exhaust gas composition is no longer sufficient to ensure low emissions. If the emissions then lie outside the legal requirements, it is within the scope of the on-board diagnostics of the internal combustion engine to detect the faulty dynamics and provide for a corresponding error message.

In the German patent publication DE 102 60 721 A1, a method for diagnosing the dynamic properties of a lambda probe which is used at least intermittently for cylinder-specific lambda control as well as an associated diagnostic device is described. The method is thereby characterized in that at least one manipulated variable of the lambda control is measured and compared with a predefinable maximum threshold and, in the event of an exceedance of the maximum threshold, the dynamic behavior of the lambda probe is evaluated as being insufficient with regard to usability for the cylinder-specific lambda control. The dynamic properties of the lambda probe can even be detected from the cylinder-specific control because the cylinder-specific controllers diverge when the dynamics of the lambda probe are insufficient. Furthermore, a test mode of operation with a targeted disturbance or detuning of the current lambda value can be provided. Said method is, however, only suitable for internal combustion engines with cylinder-specific lambda control or else a targeted manipulation of the lambda value is required.

Other diagnostic methods are known for determining the dynamic properties of lambda probes. Hence, a measured lambda signal can, for example, be compared with an expected lambda signal in the case of a known excitation.

A disadvantage with many known methods is that only a change in the time constant of the lambda probe can thereby be detected but not a pure dead time in the probe signal. When the lambda probe is periodically excited, it is for instance not possible to detect a pure dead time in a comparison between the measured and the expected lambda signal. This is the case because there is no possibility to decide whether an observed reaction in the measured lambda signal can be traced back to the excitation of the directly preceding period or to an earlier period.

When diagnosing two point lambda probes, the evaluation of the duration of the resulting controller oscillation is known. Due to the steplike change in the output signal of the two point lambda probe at $\lambda=1$, a linear control, as it is used for wideband lambda probes, is not possible. The lambda control circuit for two point lambda probes is therefore generally carried out by a two point control algorithm. In this control algorithm, the signal passage through a threshold in the rich direction causes a step change in the manipulated controller variable toward lean, whereupon the fuel/air mixture and consequently the exhaust gas composition is changed with a constant gradient in the direction of lean. If the lambda signal passes through a second threshold in the lean direction on account of this change in the actuating variable, the manipulated controller variable then jumps again toward rich, followed by a change in the fuel/air mixture and consequently in the exhaust gas composition with a constant gradient in the direction of rich. In this way, a cyclical course of lambda signal and manipulated controller variable results, wherein the cycle duration depends on the distance parameters, the controller parameters and on the dynamics of the two point lambda probe. If the response characteristics of the two point lambda probe protract, for example due to the effects of ageing, this then leads to an extension of the cycle duration. If this exceeds a predetermined limit value, it can be concluded that the dynamics of the two point lambda probe are no longer sufficient.

With methods of this kind, symmetrical errors in the probe dynamics, i.e. the signal of the probe is equally delayed on both flanks, are in fact easily detected. The detection of asymmetric errors on the other hand is only possible to a limited extent with these methods. Asymmetric errors in the probe dynamics, of course, also lead to an extension of the cycle duration, but to such a limited extent that a reliable error detection using conventional methods is only possible in the case of very large errors. The asymmetric error in probe dynamics has, however, a greater impact on the exhaust gas than does a symmetrical error. For that reason, the detection of an asymmetric error represents a large challenge.

It is therefore the aim of the invention to provide a method, which allows for a reliable and improved on-board diagnostics of the dynamics of an exhaust gas sensor.

It is furthermore the aim of the invention to provide a corresponding device.

SUMMARY

The aim relating to the device is met because of the fact that a diagnostic apparatus, which is connected to the exhaust gas sensor, comprises a diagnostic controller, with which at least one actuator intervention can be specified specifically in the direction of an asymmetric behavior. The presence, respectively the scale, of the asymmetric dynamic error of the exhaust gas sensor can then be detected from the extent of the intervention when said intervention is being compensated as a result of a possible asymmetric dynamic error of the exhaust gas sensor.

During the diagnosis, provision is thereby made in the method according to the invention for at least one actuator intervention to be specified by means of a control algorithm of a diagnostic controller specifically in the direction of an asymmetric behavior, which is achieved by an extension of one of the two ramps, up until said intervention is compensated by a possible asymmetric dynamic error of the exhaust gas sensor, a reaction to the actuator intervention being used as a criterion for assessing said asymmetric dynamic error of the exhaust gas sensor.

This targeted extension of the ramp exactly corresponds to the influence of the probe error, respectively to the error pattern. Said extension of the ramp, respectively the reaction to said extension of the ramp serves as a diagnostic criterion. With the inventive method and device for carrying out said method, even small asymmetric dynamic errors of the exhaust gas sensor, which can be embodied as a two point or wideband lambda probe, can especially be detected quickly and reliably. This is an advantage with regard to an improved on-board diagnostics (OBD), with which particularly the strict legal requirements in the USA with regard to the detection of a faulty response time of an exhaust gas sensor can be met. As a result, the influence on the exhaust gas composition due to an asymmetric dynamic error of the lambda probe can furthermore be significantly reduced.

The diagnostic apparatus can thereby be a component of an overriding engine management system. The functionality of the control algorithm is thus preferably implemented as software in the diagnostic apparatus. Provision can thereby be made for an error to be entered into an error memory associated with the central engine management system and/or for a warning indication to be displayed.

The method takes advantage of the fact that in the case of a lambda probe, which has an asymmetric dynamic error, when an actuator intervention in the direction of an asymmetric behavior is employed, said actuator intervention is compensated by the asymmetric dynamic error of the lambda probe. Provision is thereby particularly made for a minimization of a mean lambda deviation, which is determined by means of a sensor, from the ideal value of $\lambda=1$ to be used as the control target.

This control target can be particularly well detected if a further exhaust gas sensor is used as sensor, which is disposed in the direction of flow of the exhaust gas downstream of the catalytic converter. This exhaust gas sensor can likewise be embodied as a two point or as a wideband lambda probe and is connected to a diagnostic apparatus.

A preferred modification to the method provides a step-by-step controller. In so doing, the control algorithm provides an adjustment of the actuator intervention in defined steps and after every step, after a waiting period, in which the influence of the catalytic converter can die down, determines the mean lambda deviation, and another step-by-step adjustment of the actuator intervention is carried out if the control target is not achieved. This procedure is repeated up until, for example, the mean lambda error does not meet a predefined threshold value. This control algorithm can be easily implemented from a software standpoint within the diagnostic apparatus.

An alternative, likewise preferred diagnostic strategy provides among other things a continuous controller, with which in conjunction with the control algorithm a continuous adjustment of the actuator intervention is carried out until the control target is achieved.

In order to implement an asymmetric actuator intervention, different interventions are conceivable. A preferred modification to the method makes provision for a delay time up until a signal jump of the exhaust gas sensor in the opposite direction of an error pattern to be used as an actuator intervention. In so doing, an artificial delay of the sensor dynamics, which in each case are not influenced by the error pattern, serves as the actuator intervention. A lambda deviation caused by the asymmetric delay of the probe signal is consequently compensated by an artificial delay of the actual signal, of the lambda control during a probe jump in the opposite direction. The actuator intervention of the controller serves as the diagnostic criterion "error present" or "no error".

Provision is made in a modification to the method for an extension of the cycle duration of a pre-catalytic converter control to be used as the criterion for a diagnostic decision after the diagnostic controller has been stabilized. Other criteria, which can be combined with each other in making the diagnostic decision, can alternatively be used as criteria for said diagnostic decision.

The diagnostic strategy can thereby provide that the diagnostic controller, which has the previously mentioned features, is activated in the event of the error being under suspicion, as, for example after the cycle duration described above occurs, or is permanently activated.

BRIEF DESCRIPTION OF THE DRAWINGS

The invention is described below in detail with the aid of an exemplary embodiment which is depicted in the figures. The following are shown.

DETAILED DESCRIPTION

Figure 1:
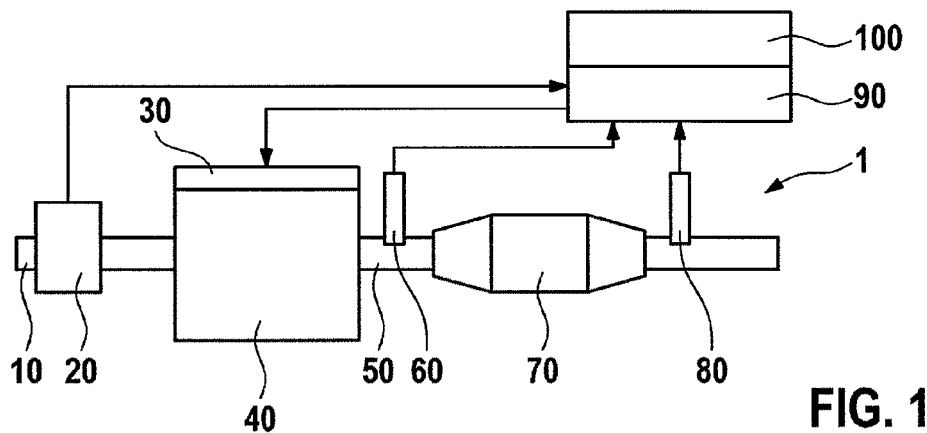
FIG. 1 the technical environment in a schematic depiction, in which the method according to the invention can be used, FIG. 2 a temporal course of a probe signal as well of a delayed probe signal and FIG. 3 another temporal course of the probe signals, in which case an actuator intervention includes a delay time.

FIG. 1 shows by way of example a technical environment, in which the method according to the invention can be used. In so doing, the depiction limits itself to the components which are necessary for the explanation of the invention.

In the figure, an internal combustion engine 1, consisting of an engine block 40 and a supply air duct 10, which provides the engine block 40 with combustion air, is depicted, wherein the quantity of air in the supply air duct 10 can be determined by a supply air measuring device 20. The exhaust gas of the internal combustion engine 1 is thereby led across an exhaust gas emission control system, which includes an exhaust gas duct 50 as the main component, wherein a first exhaust gas sensor 60 is disposed in the direction of flow of the exhaust gas upstream of a catalytic converter 70 and as the case may be a second exhaust gas sensor 80 is disposed in the direction of flow of the exhaust gas downstream of the catalytic converter 70.

The exhaust gas sensors 60, 80 are connected to a control device 90 (engine electronics), which calculates the mixture from the data of said exhaust gas sensors 60, 80 and the data of the supply air measuring device 20 and activates a fuel metering device 30 for the metering of fuel. The invention provides for a diagnostic device 100, with which the signals of said exhaust gas sensors 60, 80 can be evaluated, to be in combination with the control device 90 or an integral part thereof. The diagnostic device 100 can furthermore be connected to a display/memory unit, which is not depicted here.

A lambda value, which is suited to the emission control system for achieving an optimal purification effect, can be set with the exhaust gas sensor 60, which is disposed in the exhaust gas duct 50 behind the engine block 40, with the aid of the control device 90. The second exhaust gas sensor 80 disposed in the exhaust gas duct 50 downstream of the catalytic converter 70 can likewise be evaluated by said control device 90 and serves the purpose of determining the oxygen storage capability of the exhaust gas emission control system in a method according to the technical field.

An internal combustion engine 1 is shown here by way of example, which only has one exhaust gas duct 50. The inventive method, however, also extends to internal combustion engines 1 having multiple bank exhaust gas systems, in which the cylinders are aggregated in a plurality of groups and the exhaust gas of the different cylinder groups is guided into separate exhaust gas ducts 50, in which at least one exhaust gas sensor is disposed in each case.

The method likewise extends to the case where other exhaust gas sensors, e.g. the exhaust gas sensor 80 as shown in FIG. 1, are arranged upstream of or downstream of the exhaust gas sensor 60 being considered. First and foremost the method is, however, directed at the first lambda probe in the direction of flow downstream of the exhaust valves in the internal combustion engine 1, which is used for the lambda control. Provision is thereby made for the control algorithm for the diagnosis of the sensor dynamics to be implemented in the diagnostic device 100 integrated in the control device 90.

A linear lambda control algorithm is provided in the control device 90 for the normal operation of the internal combustion engine 1. The exhaust gas sensor 60, which is embodied as a wideband lambda probe, determines the oxygen content in the exhaust gas and forms a corresponding output signal, which is provided to said control device 90. From the output signal, said control device 90 forms the manipulated controller variables for the fuel metering device 30 and for the throttle devices in the supply air duct 10 to adjust the air quantity supplied to such an extent that said internal combustion engine 1 is operated with a predetermined lambda value, that is to say with a predetermined air/fuel ratio. The invention provides for an operation at $\lambda=1$ for an optimized exhaust gas aftertreatment in the catalytic converter 70 embodied as a three-way catalytic converter. A continuous-action wideband lambda probe as the exhaust gas sensor 60 in combination with a linear lambda control algorithm allows for the continuous adjustment of the manipulated controller variables without a superimposed periodic oscillation.

In the case of a two point control algorithm, the lambda in the exhaust gas moves between two predetermined limit values. If the lambda reaches a lower limit value associated with a rich air/fuel ratio, the two point control algorithm adjusts the manipulated controller variables for the fuel metering device 30 and the throttle devices such that a change in the air/fuel ratio towards a leaner setting occurs, i.e. towards an excess of air. If the lambda thereby reaches an upper limit value associated with a lean air/fuel mixture, the two point control algorithm thus adjusts the manipulated controller variables for said fuel metering device 30 and said throttle devices such that a change in the air/fuel ratio towards a rich setting occurs, i.e. towards an excess of fuel. How quickly the change between lean and rich settings occurs depends upon the selected control parameters, the control distance as well as the dynamics of the exhaust gas sensor. In the case of given control parameters as well as a given control distance, the cycle duration of the lambda oscillation is thus a measure for the dynamics of the exhaust gas sensor 60 and can correspondingly be used for the diagnosis of the dynamics of said exhaust gas sensor 60.

Figure 2:
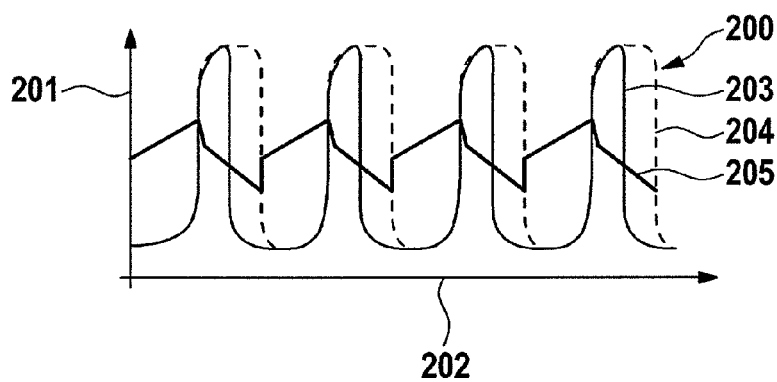

FIG. 2 shows a diagram 200 of the temporal courses of probe signals, in which a signal voltage 201 is depicted as a function of time 202. A probe signal 203 as well as an asymmetrically delayed probe signal 204 is depicted. With respect to the probe signal 203, the probe signal 204 has a flank that is asymmetrically delayed due to an asymmetric dynamic error. Furthermore, an oscillating actuator intervention 205 for producing a lambda oscillation is depicted in FIG. 2.

The method according to the invention provides a control algorithm for compensating asymmetric errors in the sensor dynamics. An artificial delay of the sensor dynamics, which in each case are not influenced by the error pattern, serves as the actuator intervention. The control target is the minimization of the mean lambda deviation which is measured with a suitable additional sensor, in the example shown said additional sensor can be the exhaust gas sensor 80, which is embodied as a lambda probe. A lambda deviation caused by the asymmetric delay of the probe signal is consequently compensated by an artificial delay of the actual signal, of the lambda control during a probe jump in the opposite direction. This actuator intervention by the controller serves as the diagnostic criterion for the detection of an error.

Figure 3:
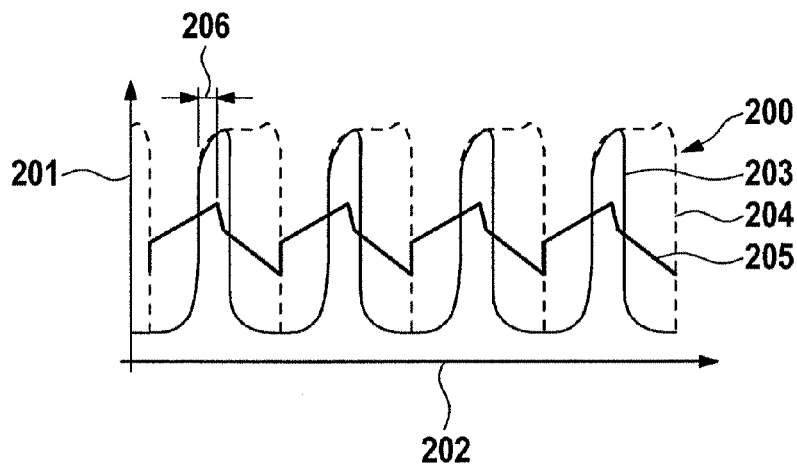

FIG. 3 shows by way of example another diagram 200 of the temporal courses of probe signals, as already depicted in FIG. 2 and previously described, in which a delay time 206 is specified when an actuator intervention 205 occurs. This action leads to an asymmetric behavior of the control circuit, which is brought about artificially and which can be compensated when an asymmetric dynamic error of the exhaust gas sensor 60 is present.

Even small asymmetric dynamic errors of the exhaust gas sensor, which can be embodied as a two point or as a wideband lambda probe, can especially be quickly and reliably detected with the method and the device for carrying out said method; thus contributing to an improved on-board diagnostics.

The invention claimed is:

1. Method for diagnosing dynamics of an exhaust gas sensor including a lambda probe which is disposed in an exhaust gas duct of an internal combustion engine in a direction of flow of exhaust gas that passes through a catalytic converter and with which an air/fuel ratio of a gas mixture supplied to the internal combustion engine is controlled via a control circuit, the method comprising:
during diagnosis, specifying at least one actuator intervention by means of a control algorithm of a diagnostic controller in a direction of an asymmetric behavior;
extending one of two ramps of a lambda signal until the actuator intervention is compensated by an asymmetric dynamic error of the exhaust gas sensor; and
using a reaction to said actuator intervention as a criterion for assessing the asymmetric dynamic error of said exhaust gas sensor.

2. The method according to claim 1, further comprising:
determining a minimization of a mean lambda deviation, by means of a sensor, from an ideal value of $\lambda=1$;
using the minimization of the mean lambda deviation as a control target.

3. The method according to claim 2, wherein the sensor is another exhaust gas sensor which is disposed in the direction of flow downstream of the catalytic converter.

4. The method according to claim 1, wherein the control algorithm provides an adjustment of the actuator intervention in defined steps and after each step of the defined steps a mean lambda deviation is determined and a further step-by-step adjustment of the actuator intervention is carried out if a control target has not been achieved.

5. The method according to claim 1, wherein a continuous adjustment of the actuator intervention is carried out with the control algorithm until a control target is achieved.

6. The method according to claim 1, wherein a delay time up until a signal jump of the exhaust gas sensor in a direction opposite to an error pattern is used as the actuator intervention.

7. The method according to claim 1, wherein an extension of a cycle duration of a pre-catalytic converter control is used as a criterion of a diagnostic decision after the diagnostic controller has been stabilized.

8. The method according to claim 1, wherein other criteria, which are combined with each other for a diagnostic decision, are used as criteria for the diagnostic decision.

9. The method according to claim 1, wherein the diagnostic controller is activated permanently or is activated in an event of an error being diagnosed.

10. Device for diagnosing dynamics of an exhaust gas sensor which is disposed in an exhaust gas duct of an internal combustion engine in a direction of flow of exhaust gas that passes through a catalytic converter and with which an air/fuel ratio of gas mixture supplied to the internal combustion engine can be controlled via a control circuit, the device comprising:
a diagnostic device including a diagnostic controller; and
the exhaust gas sensor connected to the diagnostic device;
wherein during a diagnosis, at least one actuator intervention is specified by the diagnostic controller in a direction of an asymmetric behavior;
wherein a presence and a scale of an asymmetric dynamic error of said exhaust gas sensor is detected from an extent of the actuator intervention when said actuator intervention is being compensated due to the asymmetric dynamic error of said exhaust gas sensor; and
wherein the exhaust gas sensor is a lambda probe.

11. The device according to claim 10, wherein the exhaust gas sensor is a two point lambda probe or a wideband lambda probe.

12. The device according to claim 10, wherein the diagnostic device assesses a control target of the diagnostic controller and is connected to another exhaust gas sensor which is disposed in the direction of flow of the exhaust gas downstream of the catalytic converter.

13. The method according to claim 1, wherein the lambda probe is upstream of the catalytic converter.

14. The method according to claim 1, wherein the lambda probe is downstream of the catalytic converter.

15. The device according to claim 10, wherein the exhaust gas sensor is upstream of the catalytic converter.

16. The device according to claim 10, wherein the exhaust gas sensor is downstream of the catalytic converter.

* * * * *